Sept. 5, 1933.   E. LANGFELDT ET AL   1,925,489
METHOD FOR THE EXTRACTION OF EMULSIFIED, SUSPENDED, OR DISSOLVED
SUBSTANCES FROM LIQUIDS BY MEANS OF VOLATILE SOLVENTS
Filed July 29, 1930
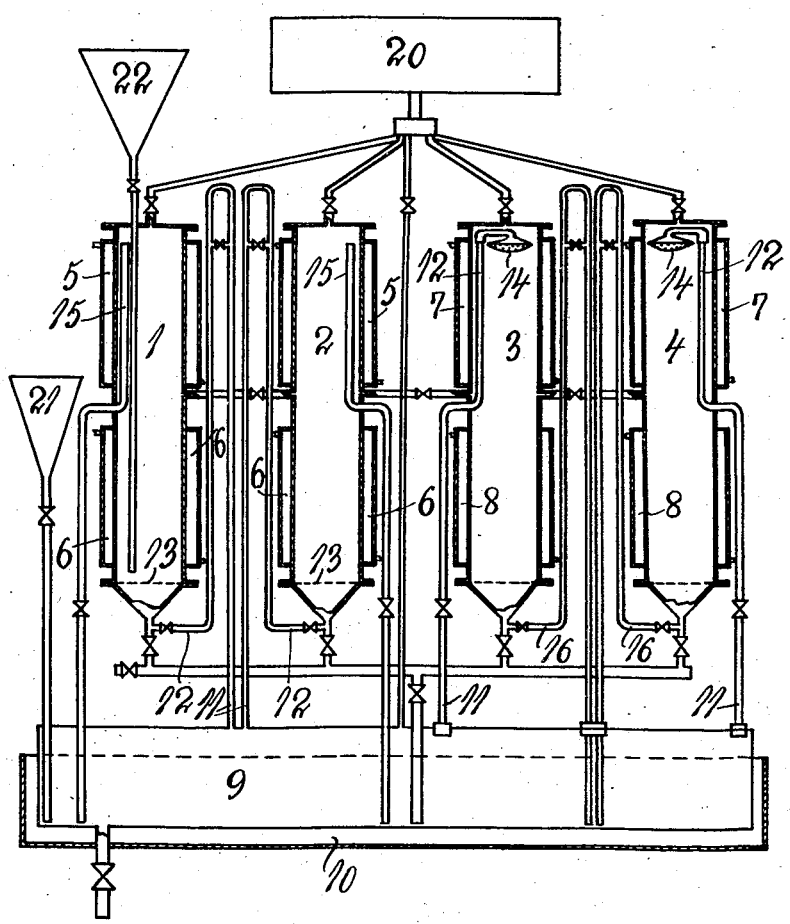

Patented Sept. 5, 1933

1,925,489

UNITED STATES PATENT OFFICE 1,925,489

METHOD FOR THE EXTRACTION OF EMULSIFIED, SUSPENDED, OR DISSOLVED SUBSTANCES FROM LIQUIDS BY MEANS OF VOLATILE SOLVENTS

Einar Langfeldt and Ragnvald Hellerud, Oslo, Norway

Application July 29, 1930. Serial No. 471,578

2 Claims. (Cl. 167—81)

This invention relates to the manufacture of vitamine preparation and has for its object a method of treating liquids containing vitamines in a dissolved, suspended or emulsified condition with volatile solvents for the purpose of extracting the vitamines.

An important characteristic feature of the invention consists therein that the volatile solvent is introduced into the liquid to be treated in the form of vapour which is caused to be condensed in the liquid in the form of exceedingly small drops.

The initial material from which the vitamines are to be recovered is preferably subjected to a special preparatory treatment previously to the treatment with volatile solvent. Thus, if the initial material is in a solid condition, it will have to be dissolved or disintegrated and converted into an emulsion or suspension in a suitable liquid.

If the raw material is an oil or fat, for example fish liver oil, a suitable preparatory treatment will usually consist in a saponification treatment to convert the fat into a soap, which is then subjected to the extraction treatment in a dissolved or suspended condition.

According to the nature of the liquid to be treated and of the volatile extraction agent in question, the vapours of the extraction agent will be introduced at the bottom of the vessel, containing the liquid to be treated, or at the surface of said liquid or also at points between bottom and surface.

In case of the liquid to be treated having a higher specific gravity than the condensed solvent, it will be suitable to introduce the vapours at or near to the bottom of the extraction vessel, while in cases where the conditions are the reverse, it will be preferred to introduce the vapours at a higher point in the liquid, for example immediately below the surface of the liquid.

During the treatment with the solvent vapours, the liquid is maintained at a temperature below the boiling point of the solvent, so that the vapours will be condensed in the liquid.

When the vapour supply is arranged as above indicated, the condensed extraction agent will move through the liquid in a direction from the point of supply as a consequence of the difference in specific gravity between liquid and extraction agent, and while thus moving through the liquid, it will take up soluble substances from the liquid.

The resulting solution can be brought to flow continuously or intermittently from the extraction vessel, to be further treated for separating the dissolved substances.—The extraction agent separated from dissolved material by distillation, absorption or by other means may anew be introduced into an extraction vessel in the form of vapour.

The vapours of extraction agent are introduced into the liquid to be treated in a finely divided form, for example by being forced into the liquid through a wall of porous material or provided with fine holes. The vapours will then become condensed as very small drops, so that the extraction agent is thoroughly distributed in the liquid.

The required cooling of the liquid may be brought about by cooling means of known character, for example by passing a cooling fluid through inserted coils or other cooling channels or vessels or through cooling jackets, surrounding the extraction vessel. It is preferred to so arrange the cooling means as to allow of producing different degrees of cooling at different levels or (and) at different places in the extraction vessel, because this will besides having other advantageous effects promote the circulation and mixing of liquid and condensed extraction agent. Powerful cooling will in most instances be of advantage. Thus it will frequently be desirable to cool the liquid so strongly as to cause the liquid at the walls of the cooling members to attain a temperature near the freezing point of the liquid.

An apparatus constructed and operating in accordance with the invention is diagrammatically illustrated in the accompanying drawing. In the illustrated example, 1 and 2 are lixiviation vessels for use in cases where the volatile lixiviation liquid is lighter than the liquid to be lixiviated. 3 and 4 are lixiviation vessels for use in cases where the lixiviation agent is heavier than the treated liquid. 5,5, 6,6, 7,7, 8,8, are jackets for circulation of cooling fluid. 9 is a vessel for volatile lixiviation agent, placed in a water bath 10.

Vapours of lixiviation agent passes from the vessel 9 through the pipes 11, 12 to the lixiviation vessels 1, 2, 3 and 4. In the vessels 1 and 2 the pipes 11 open at the bottom of the vessels below a perforated partition 13. In the vessels 3 and 4 the pipes end in a perforated nozzle or spray rose 14 at the top of the vessels, 15 and 16 are pipes through which condensed volatile solvent with dissolved matter flows back into the vessel 9 at the bottom of this latter. 20 is a reflux condenser, which can be brought in communication with the top of the lixiviating vessels 1, 2, 3, 4. 22 is a funnel for charging the lixiviating vessels with liquid to be extracted. 21 is a funnel through which volatile solvent is introduced into the vessel 9.

*Example.*—Cod liver oil is saponified with an alcoholic solution of caustic soda. The resulting solution of soaps is introduced into the lixiviating vessel (1, 2) and vapours of benzol is introduced into the solution through the porous partition. The volatile solvent condenses in the form of fine drops forming an emulsion with the soap solution. The condensed drops of solvent ascend slowly and accumulate at the top of the vessel, from where it flows back into the heated solvent reservoir.

The method and apparatus above described can be used in connection with materials of any kind, from which vitamines or other constituents are to be lixiviated by means of a volatile solvent. The solvent to be used will of course be varied in accordance with the character of the material and the conditions of operation in each instance.

We claim:

1. The method of treating solutions of a water-soluble soap containing vitamines, to separate the vitamines by means of a volatile vitamine solvent which is incompletely soluble in and has a specific gravity different from that of the said solution, which comprises vaporizing said solvent and passing the vapour in the form of fine streams into a body of said solution, maintaining the temperature of the solution considerably below the condensation point of the vapour so as to effect rapid condensation of the streams of vapour, allowing the condensed particles of solvent to pass a considerable distance through the remaining solution and then separating and collecting the solvent from the treated liquid.

2. The method of extracting vitamines from solutions of a water soluble soap containing vitamines which comprises, vaporizing a volatile vitamine solvent which is incompletely soluble in and has a specific gravity different from said solution, passing fine streams of said vapors into a body of said solution, condensing the vapor in said solution, passing the condensed particles of solvent through said remaining solution, and separating and collecting the solvent from the said solution.

EINAR LANGFELDT.
RAGNVALD HELLERUD.